United States Patent
Ma et al.

(10) Patent No.: US 10,217,250 B2
(45) Date of Patent: Feb. 26, 2019

(54) MULTI-VIEW TOMOGRAPHIC RECONSTRUCTION

(71) Applicant: Siemens Medical Solutions USA, Inc., Malvern, PA (US)

(72) Inventors: Jun Ma, Palatine, IL (US); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 167 days.

(21) Appl. No.: 15/315,719

(22) PCT Filed: Jun. 16, 2015

(86) PCT No.: PCT/IB2015/054533
§ 371 (c)(1),
(2) Date: Dec. 1, 2016

(87) PCT Pub. No.: WO2015/193802
PCT Pub. Date: Dec. 23, 2015

(65) Prior Publication Data
US 2017/0098316 A1    Apr. 6, 2017

Related U.S. Application Data (60) Provisional application No. 62/012,445, filed on Jun. 16, 2014.

(51) Int. Cl.
*G06K 9/00* (2006.01)
*G06T 11/00* (2006.01)
*G06T 17/00* (2006.01)

(52) U.S. Cl.
CPC ......... *G06T 11/006* (2013.01); *G06T 11/008* (2013.01); *G06T 17/00* (2013.01);
(Continued)

(58) Field of Classification Search
CPC ..... G06T 11/006; G06T 11/008; G06T 17/00; G06T 2211/436; G06T 11/003
(Continued)

(56) References Cited

U.S. PATENT DOCUMENTS

2003/0190065 A1* 10/2003 Hamill .................. G01T 1/2985
                                                                    382/131
2005/0152590 A1*  7/2005 Thieret ................. G06T 11/006
                                                                    382/131
(Continued)

FOREIGN PATENT DOCUMENTS

| CN | 101031938 A | 9/2007 |
| CN | 102364524 A | 2/2012 |

(Continued)

OTHER PUBLICATIONS

Ing-Tsung, Hsiao et al. "An accelerated convergent ordered subsets algorithm for emission tomography; An accelerated convergent ordered subsets algorithm for emission tomography", Physics in Medicine and Biology, Institute of Physics Publishing, Bristol GB, vol. 49, No. 11, Jun. 7, 2004, pp. 2145-2156.

(Continued)

*Primary Examiner* — Van D Huynh (57) ABSTRACT

Projection data are acquired for a portion of the body of a patient at multiple views using one or more detectors, the projection data including multiple two dimensional (2D) projections. A 3D image is initialized. For each view among the plurality of views, the 3D image is transformed using a view transformation corresponding to said view to generate an initial transformed image corresponding to said view, and multiple iterations of an MLEM process are performed based on at least the initial transformed image and the projection data. The MLEM process is initialized with the (Continued)

initial transformed image. The 3D image is updated based on an output of the MLEM process.

20 Claims, 6 Drawing Sheets

(52) U.S. Cl.
CPC .............. *G06T 2207/10108* (2013.01); *G06T 2211/424* (2013.01); *G06T 2211/436* (2013.01)

(58) Field of Classification Search
USPC .......................................................... 382/131
See application file for complete search history.

(56) References Cited

U.S. PATENT DOCUMENTS

| | | | | |
|---|---|---|---|---|
| 2009/0110255 A1* | 4/2009 | Vija | ...................... | G06T 11/006 |
| | | | | 382/131 |
| 2010/0014730 A1* | 1/2010 | Hahn | ........................ | G06T 5/50 |
| | | | | 382/131 |
| 2014/0177785 A1* | 6/2014 | Funk | ...................... | A61B 6/032 |
| | | | | 378/9 |
| 2016/0166218 A1* | 6/2016 | Williams | ............. | A61B 6/4258 |
| | | | | 600/431 |

FOREIGN PATENT DOCUMENTS

| | | |
|---|---|---|
| CN | 102525501 A | 7/2012 |
| CN | 103180883 A | 6/2013 |
| HU | P0400894 | 8/2006 |
| HU | 226835 | 11/2009 |
| HU | P1200013 | 7/2013 |

OTHER PUBLICATIONS

PCT International Search Report and Written Opinion dated Sep. 4, 2015 (10 pages).
Search Report for Corresponding Hungarian Patent Application No. P1700011, dated Mar. 24, 2017.
L.A. Shepp and Y. Vardi, "Maximum Likelihood Reconstruction for Emission Tomography," IEEE Transations on Medical Imaging, vol. 1, pp. 113-122 (1982).

\* cited by examiner

MULTI-VIEW TOMOGRAPHIC RECONSTRUCTION

CROSS-REFERENCE TO RELATED APPLICATION

This application claims priority under 35 U.S.C. § 119(e) from U.S. Provisional Application Ser. No. 62/012,445 filed Jun. 16, 2014, the entirety of which is hereby incorporated by reference herein.

FIELD

Aspects of the present disclosure relate in general to medical imaging, and more particularly to improved single photon emission computed tomography (SPECT) reconstruction of 3D images.

BACKGROUND

Medical imaging of metabolic and biochemical activity within a patient is known as functional imaging. Functional imaging techniques include, for example, nuclear imaging such as Positron Emission Tomography (PET), Single Photon Computed Tomography (SPECT), functional magnetic resonance imaging (fMRI), and functional computed tomography (fCT). An overview of SPECT, PET systems, their combination with computer tomography (CT) systems as well as iterative image reconstruction for emission tomography is given in chapter 7, chapter 11, and chapter 21 of M. Wernick and J. Aarsvold, "Emission tomography: the fundamentals of PET and SPECT," Elsevier Academic Press, 2004, the contents of which are herein incorporated by reference.

In general, SPECT imaging is performed by using a gamma camera to acquire multiple two-dimensional (2D) projections and then using a computer to perform tomographic image reconstruction to obtain a three-dimensional (3D) image. For example, a gamma photon-emitting radioisotope may be introduced into a patient's body, and any of various techniques can be used to bind the radioisotope to a location of interest in the body. The patient lies on a bed, and one or more gamma cameras are attached to the gantry which rotates, causing the gamma camera(s) to rotate around the patient. Detectors of the gamma camera(s) acquire projection data at each orientation by detecting gamma photons emitted by the radioisotope.

SPECT imaging devices are generally equipped with a collimator such as a parallel-hole, fan-beam, or cone-beam, or coded aperture (CA) collimator. In the case of parallel hole collimation the point response function focuses on a small area, so that each detector pixel mainly receives photons from the incoming gamma photon beam in the normal (i.e., perpendicular) direction. In the case of CA collimation, a thin shield with numerous holes (apertures) drilled in a certain pattern is placed parallel to the surface of a detector. With CA collimation, a detector pixel receives flux from various locations, so the projections from different regions of the source overlap, introducing complexities to the task of tomographic image reconstruction.

SUMMARY

In some embodiments of the present disclosure, a method of generating a three dimensional (3D) image includes acquiring projection data for a portion of the body of a patient at multiple views using one or more detectors, the projection data including multiple two dimensional (2D) projections. A 3D image is initialized. For each view among the plurality of views, the 3D image is transformed using a view transformation corresponding to said view to generate an initial transformed image corresponding to said view, and multiple iterations of an MLEM process are performed based on at least the initial transformed image and the projection data. The MLEM process is initialized with the initial transformed image. The 3D image is updated based on an output of the MLEM process.

In some embodiments of the present disclosure, a method of image processing includes transforming a first 3D image using a view transformation corresponding to a view, to generate a transformed image. A second 3D image is initialized with the transformed image. For each iteration of a plurality of N iterations, wherein N is an integer greater than one, maximum likelihood expectation maximization (MLEM) processing is performed. The iterative MLEM processing refines the second 3D image by: forward projecting the second 3D image to generate a data model; comparing the data model with a two dimensional (2D) projection data set corresponding to said view, to generate a correction factor corresponding to said view; backprojecting the correction factor corresponding to said view and applying a normalization factor in image space, to generate an image update factor corresponding to said view and to said iteration, and updating the second 3D image using the image update factor corresponding to said view and to said iteration. The processing flow then proceeds to the next iteration.

In some embodiments, a machine-readable storage medium tangibly embodies a program of instructions executable by a processor to cause the processor to perform operations of the image processing/image generation methods described above.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Figure 1:
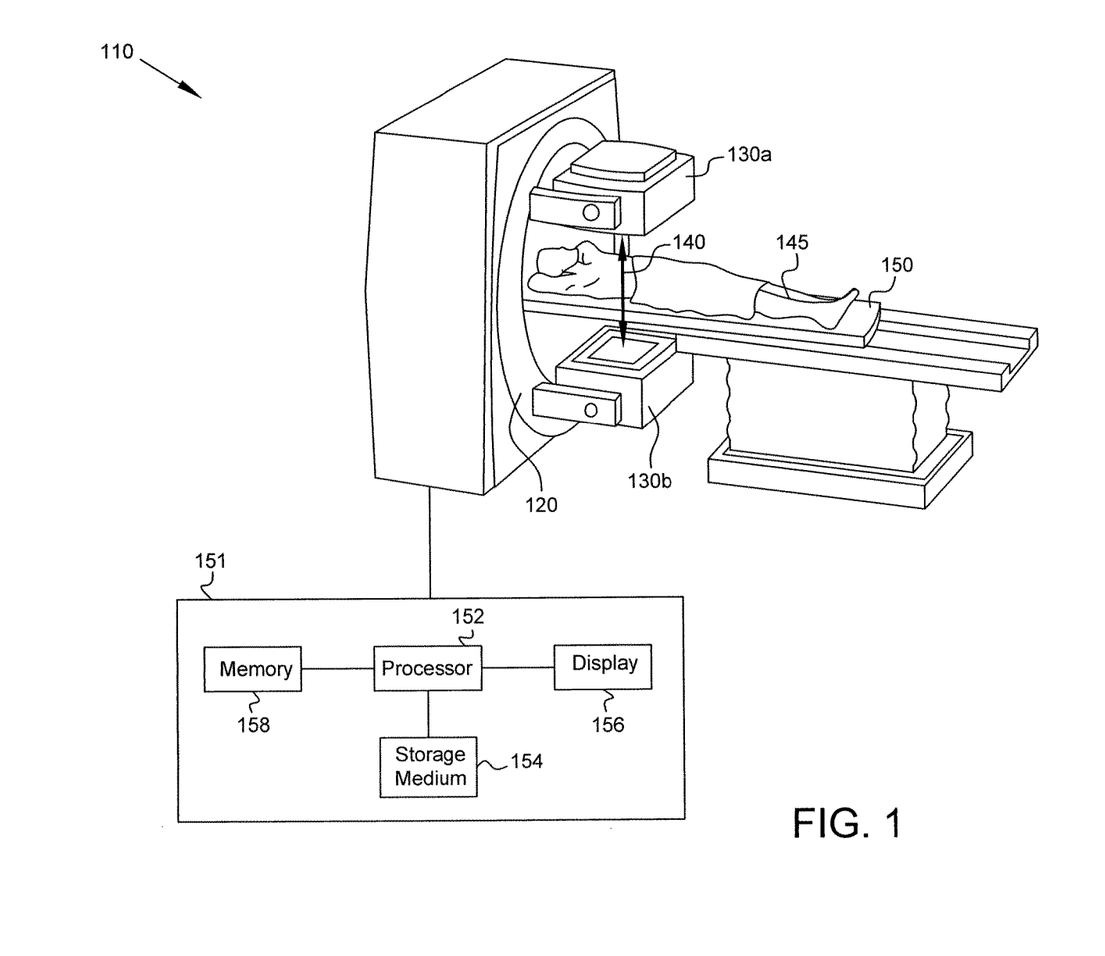
FIG. 1 is a diagram of a SPECT scanner system 110 in accordance with some embodiments of the present disclosure.

FIG. 1 is a diagram of a SPECT scanner system 110 in accordance with some embodiments of the present disclosure. SPECT scanner system 110 includes a gantry 120 to which one or more gamma cameras are attached. Two gamma cameras 130a, 130b (collectively, gamma cameras 130) are shown in FIG. 1, although other numbers of gamma cameras may be used. Detectors in the gamma cameras detect gamma photons 140 emitted by a radioisotope within the body of a patient 145 lying on a bed 150. A computer 151 may control the operation of the gamma cameras. A portion of the body of patient 145 is between gamma cameras 130 and is thus capable of being imaged. Gamma cameras 130 rotate around the patient's body as shown by the curved arrows in FIG. 1. 2D projection data are acquired at defined points during the rotation and are stored in a memory 158 of computer 151. Computer 151 may also include a processor 152, a non-transitory computer readable storage medium 154, and a display 156. Processor 152 executes instructions (described further below) stored on storage medium 154 and manipulates data stored at memory 158, to reconstruct a 3D image from the acquired projection data. The reconstructed 3D image may be displayed on a display 156.

Figure 2:
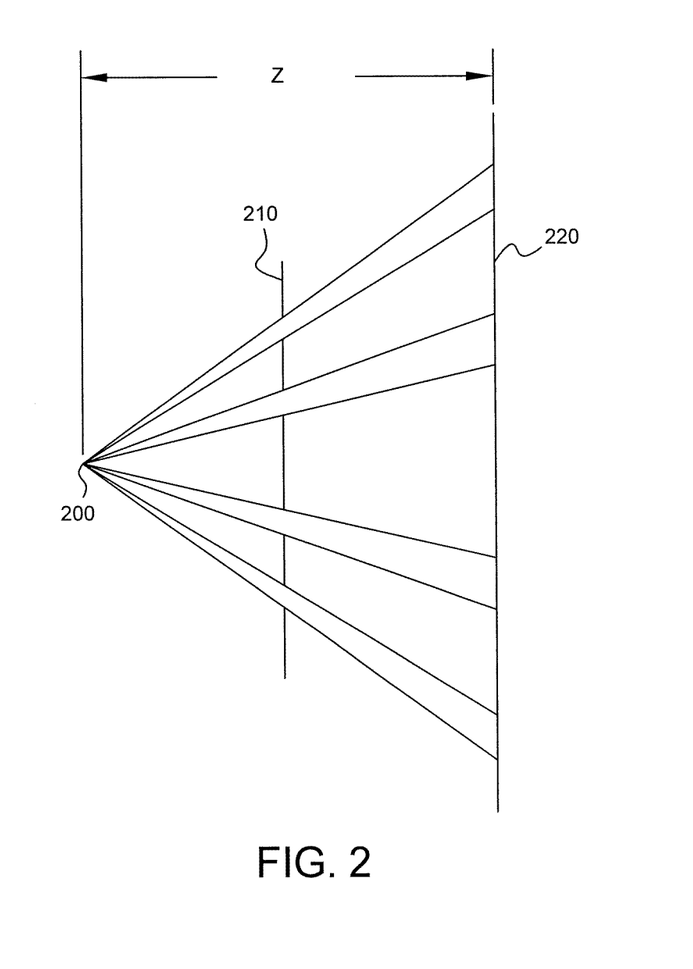
FIG. 2 is a depiction of a mask for filtering gamma photons in accordance with some embodiments, viewed from the side.
Figure 3:
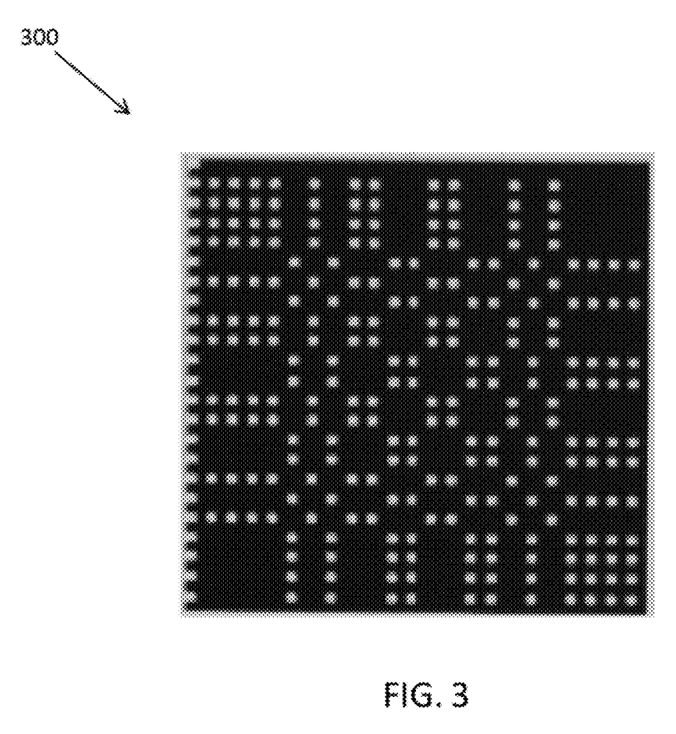
FIG. 3 is depiction of one example of a coded aperture plate 300, viewed from the front.

Referring to FIG. 2, in some embodiments a plate 210 having a plurality of apertures (holes) is positioned in front of and parallel to the surface of detector 220, which may be any of the detectors in SPECT scanner system 110. Plate 210 serves as a mask that filters incoming gamma photons emitted by a point source 200. FIG. 2 shows plate 210 and detector 220 edge-on, i.e., from the side. FIG. 3 is depiction of one example of a coded aperture plate 300, viewed from the front. A 3D object can be treated as a series of image slices in the direction perpendicular to the detector. When performing a projection, each slice correlates with a depth-dependent coded aperture matrix. The depth is denoted as z in FIG. 2 and can be varied by adjusting the position of detector 220. The final projection is the sum of all slice projections, i.e., the sum of the projections for each depth. Different views may be achieved by appropriately adjusting (e.g., rotating and/or translating) gamma camera(s) 130 attached to gantry 120.

In image reconstruction, object space and data space are related to each other through a system matrix. Thus, for any projection operation, one can use the appropriate system matrix and its transpose to transform objects between object space and data space. In general, a forward projection is an application of the appropriate system matrix an object in object space. The result of a forward projection is a "projected object" in data space. As an example in nuclear imaging, a forward projection is the linear operation that transforms the functional activity density into the total data model of predicted detection events. Corresponding to the forward projection, the backward projection from the data space into object space can be described as an application of the transpose of the appropriate system matrix.

In some embodiments, projection data are acquired for a portion of the body of patient 145 at multiple views, e.g., M views, using detector(s) 130. Each view corresponds to a particular rotation and/or translation of a detector connected to gantry 120. The projection data include multiple 2D projections.

Figure 4:
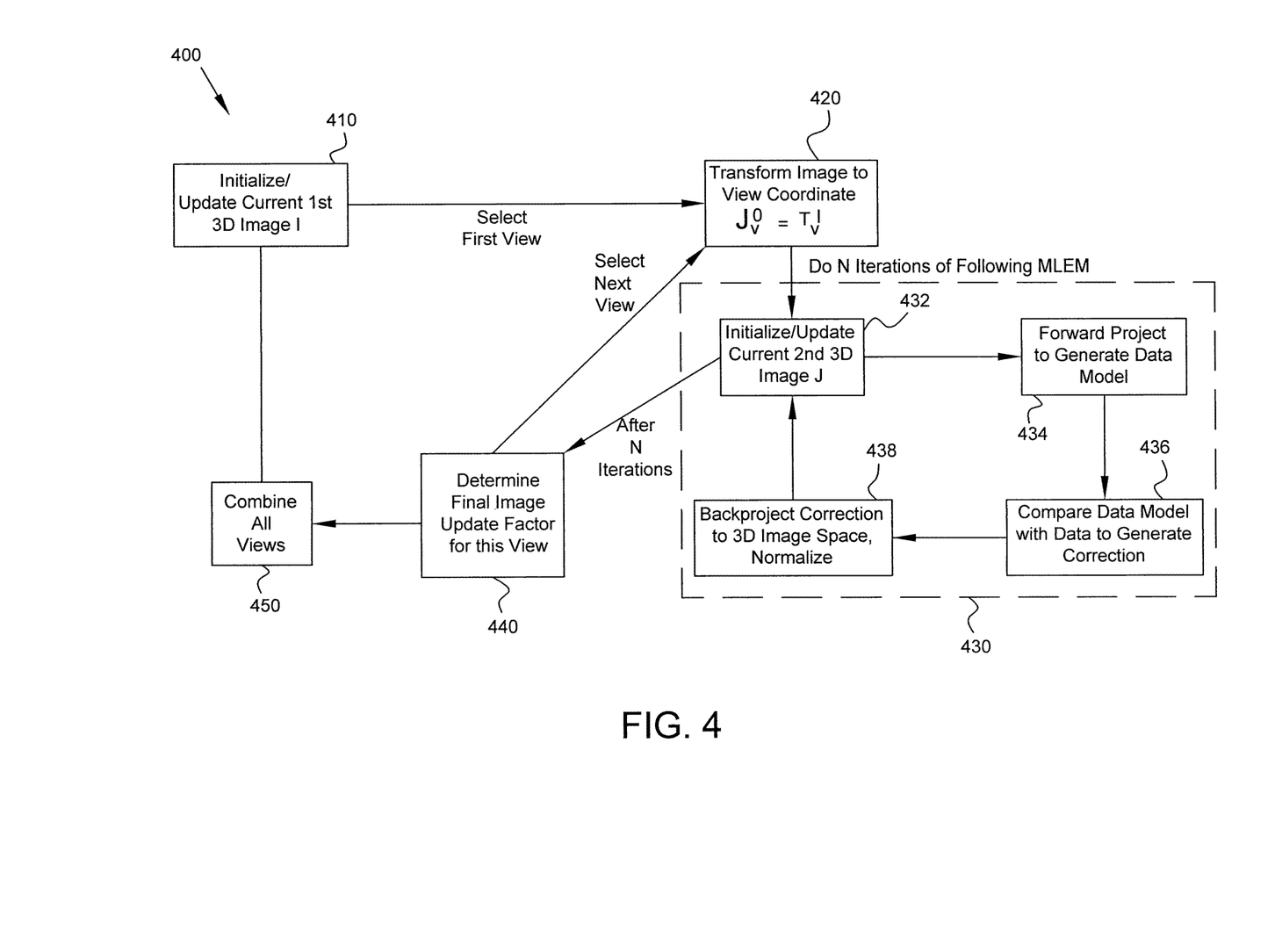
FIG. 4 is a flow diagram of a tomographic image reconstruction process 400 in accordance with some embodiments.

FIG. 4 is a flow diagram of a tomographic image reconstruction process 400 in accordance with some embodiments. At block 410, a 3D image (denoted I) is initialized. In some embodiments, I is initialized based on a 3D image mask that defines the boundary of the patient's body. The image mask may be obtained based on 3D CT imaging, for example. A single value (e.g., value of 1) may be assigned at each voxel of I located within the image mask. A first view among the M views is selected. The image I is transformed using a view transformation corresponding to the first view to generate an initial transformed image corresponding to the first view e.g., as follows:

$$J_v^0 = T_v I \qquad (1)$$

In equation (1), $J_v^0$ is the initial transformed image, and $T_v$ is the view transformation corresponding to the first view. Because the subscript v for the terms $J_v^0$ and $T_v$ denotes the view index, and because the first view has been selected, v equals 1 at this stage.

Multiple iterations, e.g., N iterations, of a maximum likelihood expectation maximization (MLEM) process 430 are performed. MLEM is described at, e.g., L. A. Shepp and Y. Vardi, "Maximum Likelihood Reconstruction for Emission Tomography," IEEE Transactions on Medical Imaging, vol. 1, pp. 113-122 (1982), the entire contents of which are hereby incorporated by reference herein. Within MLEM process 430, a 3D image J is initialized (block 432) with the initial transformed image, i.e.:

$$J = J_v^0 \qquad (2)$$

At the first iteration out of the N iterations of the MLEM loop shown in FIG. 4, J is forward projected (block 434) to generate a data model corresponding to the current view, i.e., v=1. This forward projection may be expressed as follows:

$$q_v = H_v J \qquad (3)$$

In equation (3), $q_v$ represents the data model corresponding to the current view, and $H_v$ is a system matrix corresponding to the current view.

At block 436, the data model corresponding to the current view (i.e., v=1) is compared with projection data corresponding to the current view, to generate a correction factor corresponding to the current view. This comparison may occur in data space on a pixel-by-pixel basis, e.g., by computing a ratio of the data model and projection data as follows:

$$r_v = p_v / q_v \qquad (4)$$

In equation (4), $p_v$ represents the projection data corresponding to the current view, and $r_v$ represents the correction factor corresponding to the current view.

At block 438, the correction factor for the current view is backprojected to 3D image space, and a normalization is performed, to generate an image update factor corresponding to said view and to said iteration, e.g., as follows:

$$F_v = H_v^T r_v / N_v \qquad (5)$$

In equation (5), $F_v$ is the image update factor, $H_v^T$ is the transpose of $H_v$ and $N_v$ is a normalization factor, e.g., a constant dependent on the current view. For convenience, dependence on the iteration is not denoted in the symbol $F_v$.

Then, the processing flow proceeds to block 432, where image J is updated using the image update factor corresponding to the current view and the current iteration on a per-voxel basis, e.g., as follows:

$$J^{new} = F_v J \qquad (6)$$

Then, the processing flow proceeds to the next iteration of MLEM loop 430. In this manner, N iterations of MLEM loop 430 are performed to refine image J.

After N iterations of MLEM loop 430, a final image update factor for the current view is generated, e.g., as follows:

$$F\_final_v = J^{new}/J_v^0 \qquad (7)$$

In other words, a final image update factor for each view may be computed as a ratio, on a per-voxel basis, of the final version of image J (i.e., after N iteration of MLEM process 430) to the initial version of J.

Then, a next view is selected, and flow proceeds to block 420. In this manner, similar processing as described as above is performed for each view among the M views. After block 440 is performed for the $M^{th}$ view, the final image update factors corresponding to all the views are combined, e.g., as follows:

$$F_{all} = (\Sigma_v T^T_v F\_final_v)/N_{all} \quad (8)$$

In equation (8), $N_{all}$ is a constant that is used as a normalization factor. This is one possible implementation of normalization, and other techniques for normalization may be used as well.

Flow proceeds to block 410, where image I is updated, e.g., on a voxel-by-voxel basis as follows:

$$I^{new} = F_{all} I \quad (9)$$

Thus, image I is refined by the outermost loop in FIG. 4, and additional refinement of I is achieved by additional iterations of this outermost loop, e.g., 50-200 iterations in some embodiments. This outermost loop is itself an implementation of MLEM. Thus, reconstruction process 400 includes an outer MLEM loop and an inner MLEM loop. For each view, N iterations of the inner MLEM loop 430 are performed. Traditional reconstruction approaches have only performed MLEM once for a given view and have not performed single-view-MLEM multiple times (N times) before summing the results as in various embodiments of the present disclosure. Also, traditional reconstruction approaches have not used a combination of an outer MLEM loop and an inner MLEM loop. In various embodiments, depth information is utilized more fully than in prior reconstruction techniques, e.g., because of inner loop 430 of FIG. 4, which iteratively performs MLEM for each view. In particular, by using an encoding and decoding scheme available in the coded aperture context, in various embodiments more depth information is utilized (i.e., one can obtain and use different image slices at different depth) compared to parallel hole collimators.

Figure 5:
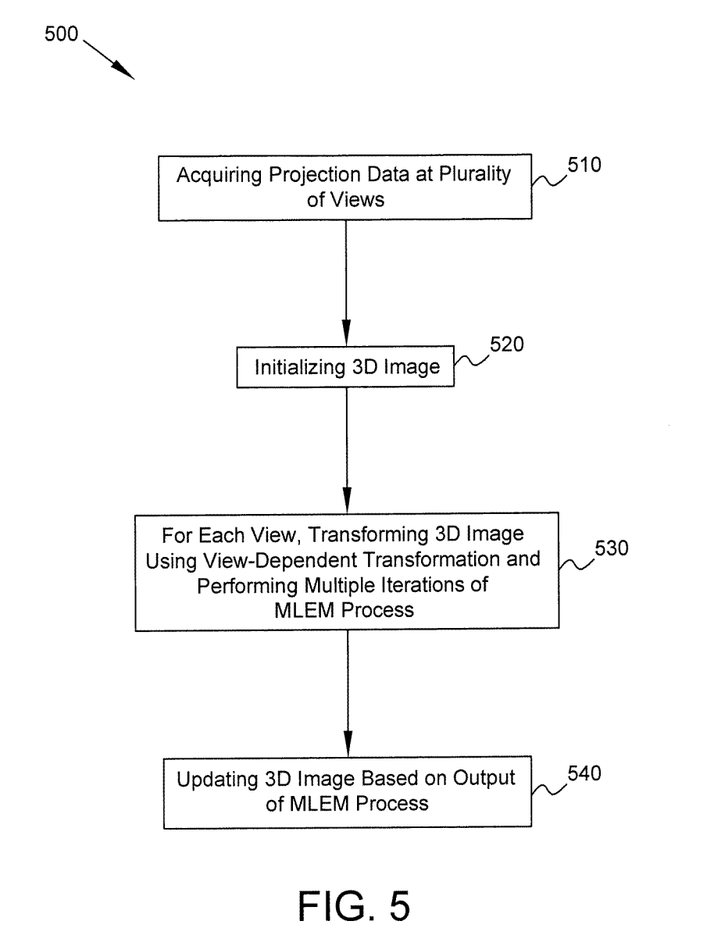
FIG. 5 is a flow diagram of a process in accordance with some embodiments.

FIG. 5 is a flow diagram of a process 500 in accordance with some embodiments. Process 500 includes acquiring (block 510) projection data for a portion of the body of a patient at multiple views using one or more detectors, the projection data including multiple two dimensional (2D) projections. A 3D image is initialized (block 520). At block 530, for each view among the plurality of views, the 3D image is transformed using a view transformation corresponding to said view to generate an initial transformed image corresponding to said view, and multiple iterations of an MLEM process are performed based on at least the initial transformed image and the projection data. The MLEM process is initialized with the initial transformed image. The 3D image is updated (block 540) based on an output of the MLEM process.

Figure 6:
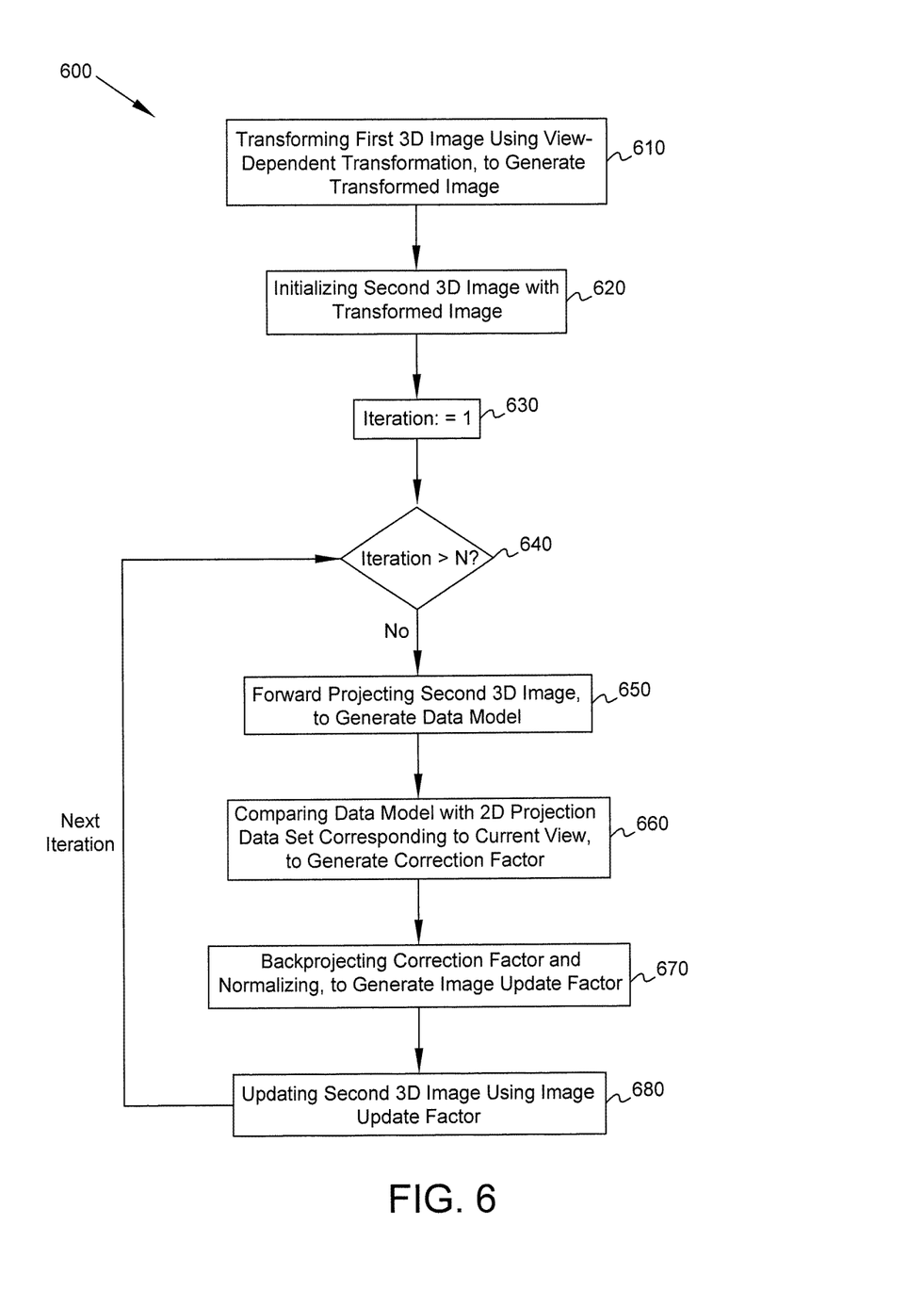
FIG. 6 is a flow diagram of a process in accordance with some embodiments.

FIG. 6 is a flow diagram of a process 600 in accordance with some embodiments. Process 600 includes transforming (block 610) a first 3D image using a view transformation corresponding to a view, to generate a transformed image. A second 3D image is initialized (block 620) with the transformed image. For each iteration of a plurality of N iterations, wherein N is an integer greater than one, maximum likelihood expectation maximization (MLEM) processing is performed. The iterative implementation is shown in FIG. 6 with blocks 630 (initializing a counter) and 640 (testing a loop condition), although other implementations may be used as well. The iterative MLEM processing refines the second 3D image by: forward projecting the second 3D image to generate a data model (block 650); comparing the data model with a two dimensional (2D) projection data set corresponding to said view, to generate a correction factor corresponding to said view (block 660); backprojecting the correction factor corresponding to said view and applying a normalization factor in image space, to generate an image update factor corresponding to said view and to said iteration (block 670); and updating the second 3D image using the image update factor corresponding to said view and to said iteration (block 680). The processing flow then proceeds to the next iteration as shown in FIG. 6.

In some embodiments, storage medium 154 tangibly embodies a program of instructions executable by processor 152 to cause processor 152 to perform operations in processes 500 and 600 as well as various other processing described herein.

It is understood by those familiar with the art that techniques described herein may be implemented in hardware, firmware, or software encoded (e.g., as instructions executable by a processor) on a non-transitory computer-readable storage medium.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method of generating a three dimensional (3D) image, the method comprising:
    acquiring projection data for a portion of the body of a patient at a plurality of views using one or more detectors, the projection data including a plurality of two dimensional (2D) projections;
    initializing a 3D image;
    for each view among the plurality of views, transforming the 3D image using a view transformation corresponding to said view to generate an initial transformed image corresponding to said view, and performing multiple iterations of a maximum likelihood expectation maximization (MLEM) process based on at least the initial transformed image and the projection data, wherein the MLEM process is initialized with the initial transformed image, and
    updating the 3D image based on an output of the MLEM process.

2. The method of claim 1, wherein performing each iteration of said MLEM process generates an updated transformed image, the method further comprising:
    for each view, based on the updated transformed image and initial transformed image corresponding to said view, computing an image update factor corresponding to said view.

3. The method of claim 2, wherein said updating the 3D image includes updating the 3D image based on the image update factors corresponding to respective ones of the plurality of views.

4. The method of claim 1, wherein the one or more detectors are attached to a gantry, and each view corresponds to a respective rotational position of the gantry.

5. The method of claim 1, wherein said transforming the 3D image for each view, said performing multiple iterations of the MLEM process for each view, and said updating the 3D image are each performed multiple times, to successively refine the 3D image.

6. The method of claim 1, wherein the 3D image is a first 3D image, and the MLEM process for each view includes:
   initializing a second 3D image with the initial transformed image corresponding to said view; and
   for each of N iterations, wherein N is an integer greater than one, performing maximum likelihood expectation maximization (MLEM) processing to refine the second 3D image by:
      forward projecting the second 3D image to generate a data model corresponding to said view;
      comparing the data model corresponding to said view with projection data corresponding to said view, to generate a correction factor corresponding to said view;
      backprojecting the correction factor corresponding to said view and applying a normalization factor in image space, to generate an image update factor corresponding to said view and to said iteration; and
      updating the second 3D image using the image update factor corresponding to said view and to said iteration.

7. The method of claim 6, wherein the first 3D image is updated based on at least a plurality of final image update factors corresponding to respective ones of the plurality of views.

8. A method of image processing, the method comprising:
   (a) transforming a first 3D image using a view transformation corresponding to a view, to generate a transformed image;
   (b) initializing a second 3D image with the transformed image;
   (c) for each iteration of a plurality of N iterations, wherein N is an integer greater than one, performing maximum likelihood expectation maximization (MLEM) processing to refine the second 3D image by:
      forward projecting the second 3D image to generate a data model,
      comparing the data model with a two dimensional (2D) projection data set corresponding to said view, to generate a correction factor corresponding to said view,
      backprojecting the correction factor corresponding to said view and applying a normalization factor in image space, to generate an image update factor corresponding to said view and to said iteration, and
      updating the second 3D image using the image update factor corresponding to said view and to said iteration.

9. The method of claim 8, further comprising:
   (d) updating the first 3D image using at least a final image update factor corresponding to said view.

10. The method of claim 8, wherein said view is a first view among a plurality of M views, M being an integer, the method further including performing steps (a), (b), and (c) for an additional M−1 views.

11. The method of claim 10, further comprising:
   (d) updating the first 3D image using at least a plurality of final image update factors corresponding to respective views.

12. A non-transitory, machine-readable storage medium, tangibly embodying a program of instructions executable by a processor to cause the processor to perform operations comprising:
   acquiring projection data for a portion of the body of a patient at a plurality of views using one or more detectors, the projection data including a plurality of two dimensional (2D) projections;
   initializing a 3D image;
   for each view among the plurality of views, transforming the 3D image using a view transformation corresponding to said view to generate an initial transformed image corresponding to said view, and performing multiple iterations of a maximum likelihood expectation maximization (MLEM) process based on at least the initial transformed image and the projection data, wherein the MLEM process is initialized with the initial transformed image, and
   updating the 3D image based on an output of the MLEM process.

13. The non-transitory, machine-readable storage medium of claim 12, wherein performing each iteration of said MLEM process generates an updated transformed image, and the instructions are further executable by the processor to cause the processor to perform operations comprising:
   for each view, based on the updated transformed image and initial transformed image corresponding to said view, computing an image update factor corresponding to said view.

14. The non-transitory, machine-readable storage medium of claim 13, wherein said updating the 3D image includes updating the 3D image based on the image update factors corresponding to respective ones of the plurality of views.

15. The non-transitory, machine-readable storage medium of claim 12, wherein the instructions are executable by a processor to cause the processor to perform each of said transforming the 3D image for each view, said performing multiple iterations of the MLEM process for each view, and said updating the 3D image a plurality of times, to successively refine the 3D image.

16. The non-transitory, machine-readable storage medium of claim 12, wherein the 3D image is a first 3D image, and the MLEM process for each view includes:
   initializing a second 3D image with the initial transformed image corresponding to said view; and
   for each of N iterations, wherein N is an integer greater than one, performing maximum likelihood expectation maximization (MLEM) processing to refine the second 3D image by:
      forward projecting the second 3D image to generate a data model corresponding to said view;
      comparing the data model corresponding to said view with projection data corresponding to said view, to generate a correction factor corresponding to said view;
      backprojecting the correction factor corresponding to said view and applying a normalization factor in image space, to generate an image update factor corresponding to said view and to said iteration; and
      updating the second 3D image using the image update factor corresponding to said view and to said iteration.

17. The non-transitory, machine-readable storage medium of claim 16, wherein updating the 3D image includes updating the 3D image based on at least a plurality of final image update factors corresponding to respective ones of the plurality of views.

18. A non-transitory, machine-readable storage medium, tangibly embodying a program of instructions executable by a processor to cause the processor to perform operations comprising:
(a) transforming a first 3D image using a view transformation corresponding to a view, to generate a transformed image;
(b) initializing a second 3D image with the transformed image;
(c) for each iteration of a plurality of N iterations, wherein N is an integer greater than one, performing maximum likelihood expectation maximization (MLEM) processing to refine the second 3D image by:
forward projecting the second 3D image to generate a data model,
comparing the data model with a two dimensional (2D) projection data set corresponding to said view, to generate a correction factor corresponding to said view,
backprojecting the correction factor corresponding to said view and applying a normalization factor in image space, to generate an image update factor corresponding to said view and to said iteration, and
updating the second 3D image using the image update factor corresponding to said view and to said iteration.

19. The non-transitory, machine-readable storage medium of claim 18, wherein the instructions are further executable by the processor to cause the processor to perform operations comprising:
(d) updating the first 3D image using at least a final image update factor corresponding to said view.

20. The non-transitory, machine-readable storage medium of claim 18, wherein said view is a first view among a plurality of M views, M being an integer, and the instructions are further executable by the processor to cause the processor to perform operations (a), (b), and (c) for an additional M−1 views.

* * * * *